July 11, 1961     A. S. PAGE     2,991,636
FLEXIBLE DRIVE ATTACHMENT FOR A VEHICLE WHEEL ASSEMBLY
Filed June 9, 1959     3 Sheets-Sheet 1

INVENTOR.
ANCEL S. PAGE
BY
ATTORNEY

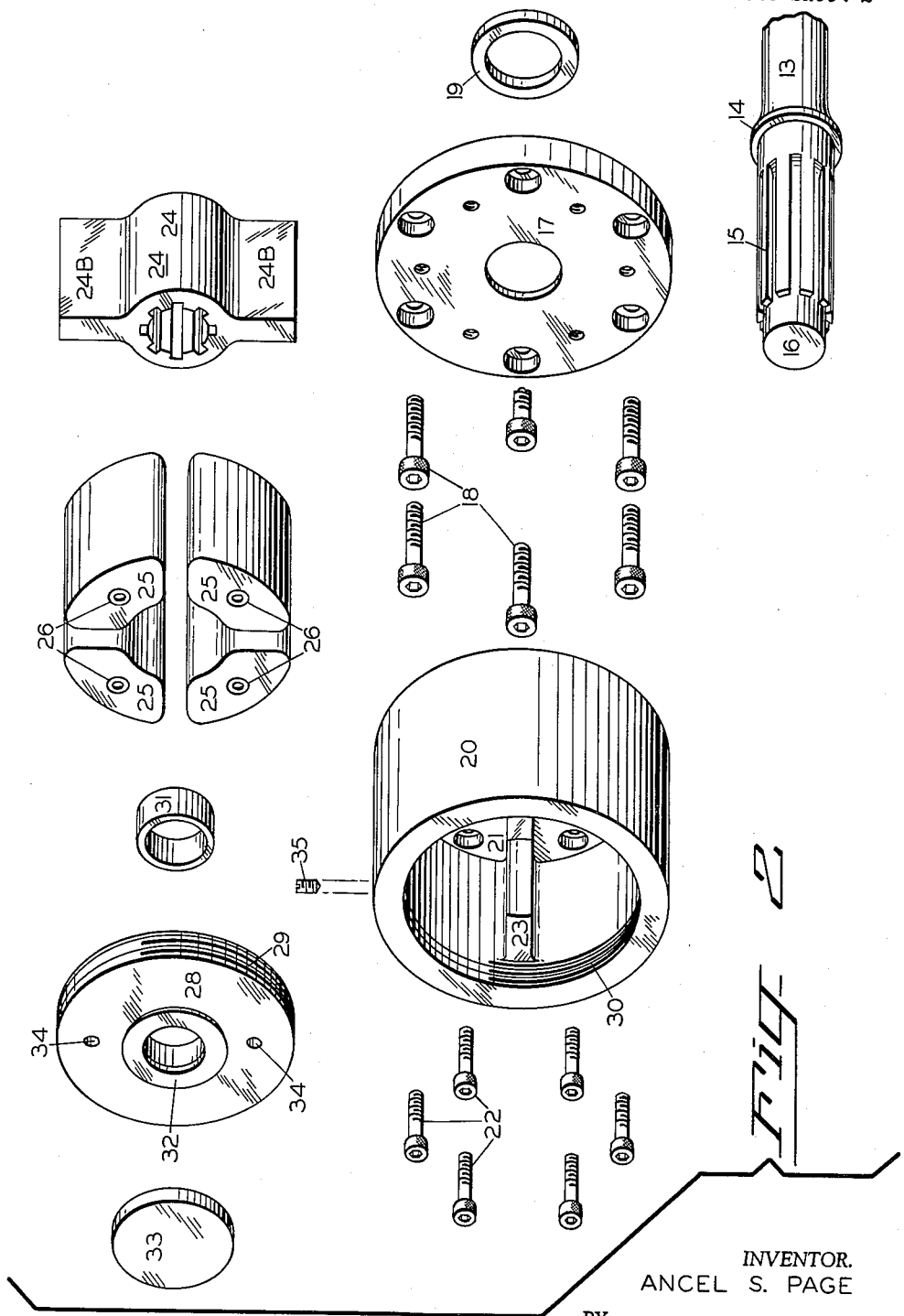

July 11, 1961      A. S. PAGE      2,991,636
FLEXIBLE DRIVE ATTACHMENT FOR A VEHICLE WHEEL ASSEMBLY
Filed June 9, 1959      3 Sheets-Sheet 3
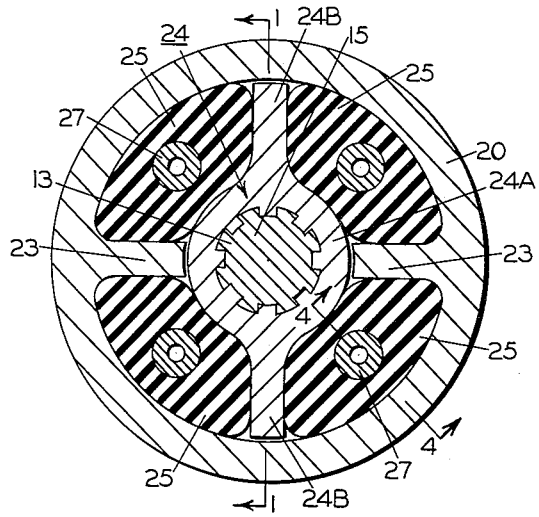
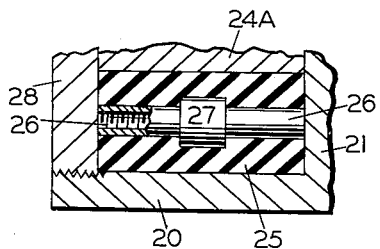
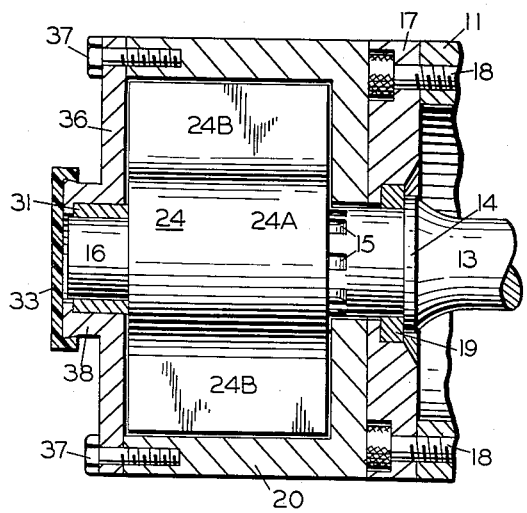
INVENTOR.
ANCEL S. PAGE

United States Patent Office 2,991,636
Patented July 11, 1961

2,991,636
FLEXIBLE DRIVE ATTACHMENT FOR A VEHICLE WHEEL ASSEMBLY
Ancel S. Page, Portland, Oreg., assignor to Dura Corporation, Oak Park, Mich., a corporation of Michigan
Filed June 9, 1959, Ser. No. 819,140
1 Claim. (Cl. 64—27)

This invention relates specifically to means by which a driven vehicle wheel is connected to the axle through which the driving power is transmitted to the wheel.

Heretofore it has been common practice to have driven vehicle wheels rigidly connected with or secured to their axles. However, it is well-known that such rigid connection between axle and wheel at times results in excessive torque strain as well as in the transmission of undesirable shocks to the entire vehicle frame. Such instances occur for example whin a driven wheel of a traveling vehicle is forced to move out of a sudden rut in the roadway into which it has dropped, or to move suddenly over a bump or other obstacle. Also, to some extent, such instances occur when a sudden impetus of driving power is applied to the drive axle for the wheel, and again when attempt is made to stop the vehicle quickly by sudden hard application of the wheel brake.

The object of the present invention is to provide an improved connection between the vehicle wheel and its axle which will have a certain amount of flexibility and thereby provide some cushioning of such strains and shocks as those above mentioned when transmitted between the wheel and its axle.

A related object of the invention is to provide an improved drive connection between a vehicle wheel and its axle, which, while having some flexibility and affording desirable shock cushioning, will nevertheless not prevent or interfere with the transmission of full driving power to the wheel from the axle.

A further object of the invention is to provide a flexible cushioning drive connection between wheel and axle which will be sturdy and capable of prolonged hard use without any special maintenance problem.

An additional object is to provide a flexible drive connection between wheel and axle which will be simple and practical in construction and not difficult to manufacture.

These objects and other incidental advantages are attained by the novel means through which a vehicle wheel and its axle are connected, as herein briefly described with reference to the accompanying drawings.

In the drawings:

FIG. 2 is an exploded view showing, in perspective, the various members and parts of the means through which the wheel hub is connected to the drive axle;

FIG. 3 is a section on line 3—3 of FIG. 1 drawn to a larger scale;

FIG. 4 is a fragmentary section on line 4—4 of FIG. 3; and

FIG. 5 is a fragmentary sectional elevation, similar in part to FIG. 1, but illustrating a slightly modified form of cover plate for the flexible drive connection assembly.

Figure 1:
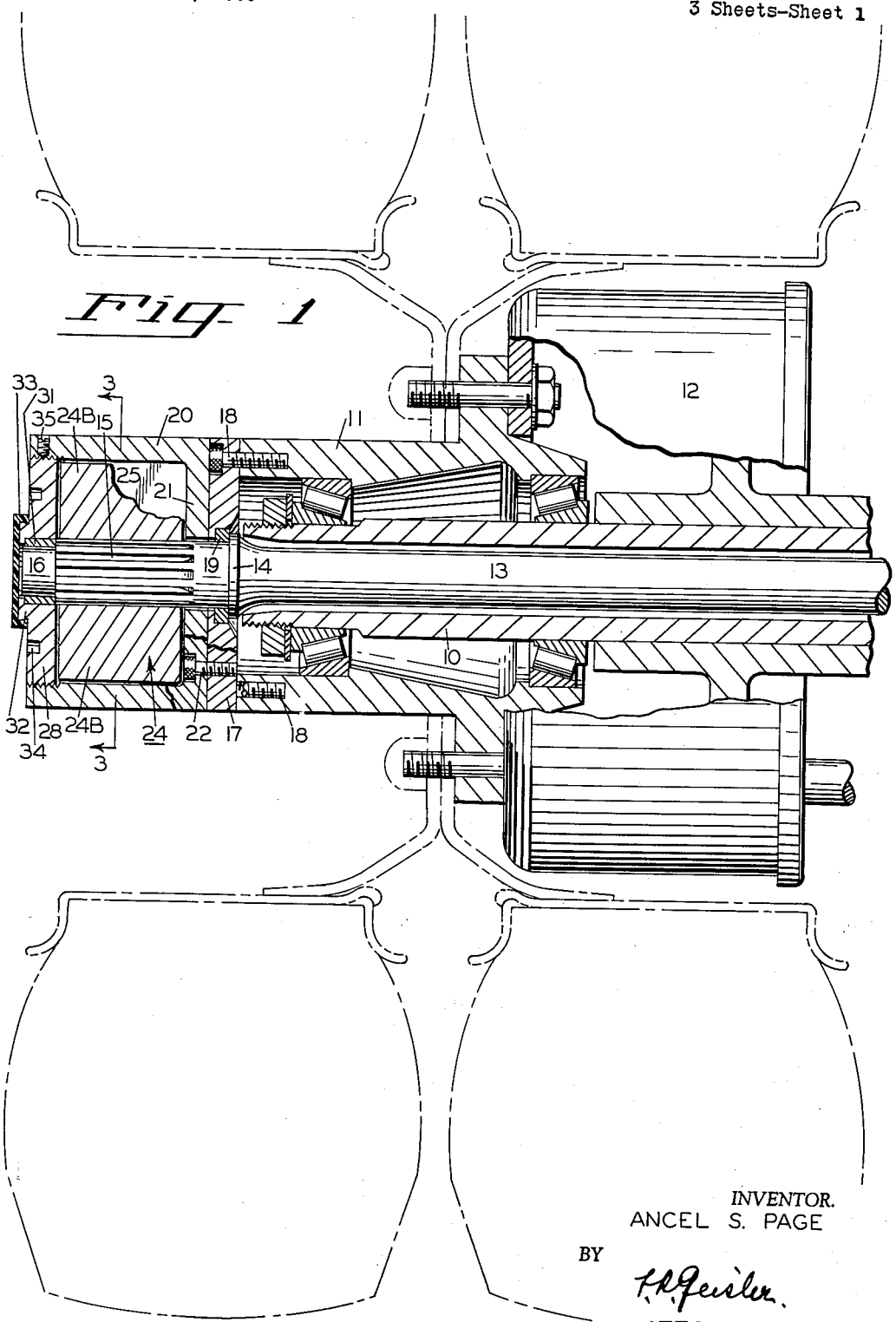
FIG. 1 is a fragmentary sectional elevation of a vehicle wheel and axle assembly embodying the present invention.

Referring first to FIG. 1, there is shown a stationary axle housing 10 of customary construction on which the wheel hub 11 is rotatably mounted in the more or less conventional manner, the wheel hub having attached thereto the customary brake drum 12.

An axle shaft 13, of special construction, is located in the axle housing as usual but the end of the axle shaft is extended beyond the end of the axle housing, the extending portion being shaped substantially as shown in FIGS. 1 and 2. Thus the axle shaft is formed with the shoulder 14, beyond which the axle shaft is grooved to form a series of equally spaced, longitudinally-extending splines 15. The shaft terminates in a reduced diameter end portion 16.

An adapter plate 17 (FIGS. 1 and 2), having a central opening for the axle shaft, is secured to the end of the wheel hub 11 by suitable screws 18. The inner face of this adapter plate has an annular recess around the central opening to accommodate an oil seal ring 19 which bears against the shoulder 14 on the axle shaft.

A cylindrical housing 20, preferably having the same external diameter as the wheel hub 11 and adapter plate 17, has an integral inner end wall 21 formed with a central opening, corresponding to that in the adapter plate, for the axle shaft. The housing 20 is firmly secured to the adapter plate 17, and therewith secured to the wheel hub 11, by suitable screws 22, the heads of the screws 22, as well as the heads of the screws 18 for the adapter plate 17, being counter sunk in recesses provided in the housing end 21 and adapter plate 17 respectively as shown.

The cylindrical housing 20 is formed with a pair of integral, diametrically opposite ribs 23 (FIGS. 2 and 3) extending radially inwardly from the inner cylindrical wall of the housing but terminating a substantial distance from the axial line of the housing, as shown best in FIG. 3, the purpose of these ribs will be apparent presently.

A drive member 24, having a splined hub portion 24A fitting on the splined axle shaft within the housing 20, and having a pair of diametrically opposite, radially-extending drive flanges 24B, is slid on the end of the axle shaft in the housing 20 and arranged with the flanges 24B spaced substantially 90° from the respective ribs 23 of the housing 20, as shown in FIG. 3. The drive flanges 24B extend to the inside cylindrical wall of the housing 20, with a slight clearance, and the ribs 23 of the housing 20 similarly extend inwardly to the hub portion 24A of the drive member 24 with a slight clearance.

The four equal spaces between the ribs 23 of the housing 20 and the drive flanges 24B of the drive member 24 are then filled with identical blocks 25 of rubber or other similar suitable resilient material (FIGS. 2 and 3). Thus, as now apparent from FIG. 3, the rotation of the axle shaft 13, producing rotation of the drive member 24 because of its splined connection with the axle shaft, will cause rotation to be imparted to the housing 20 (and therewith to the vehicle wheel hub to which the housing 20 is secured) through the intermediary of an opposite pair of the rubber blocks 25 engaged by the drive flanges 24B of the drive member 24 and engaging the ribs 23 of the housing 20, depending upon the direction of rotation of the axle shaft and drive member 24. The resiliency of the rubber blocks 25, however, causes a slight cushioning of any sudden rotary shocks delivered from the axle shaft and the drive member to the housing 20 (and likewise similar rotary shocks imparted to the drive member and axle shaft from the vehicle wheel and housing 20).

Since the rubber blocks 25, after considerable use, may become stuck to the portions of the housing and drive member with which they are in constant contact, which would consequently make their removal, or the removal of the drive member from the assembly, difficult when such removal is desired for any reason, a tubular metal member 26 (FIG. 4) is embedded centrally in each rubber block when the block is formed, the tubular metal member 26 extending from one end of the block to the other and having an enlarged central portion 27 to cause such metal tubular member to be securely anchored in the rubber block. The outer end of such tubular member 26, that is to say, the end towards the outer end of the housing 20 when the block is set in place, is internally threaded, as indicated at 26' in FIG. 4. This enables the tubular member to be engaged by the threaded end of a suitable tool so as to facilitate pulling the rubber block out of the housing 20 when removal of the block is desired for any reason.

When the drive member 24 and the four cushioning blocks 25 are in place in the housing 20, a cover plate 28 is secured in place at the outer end of the housing. This cover plate, as shown in FIGS. 1 and 2, has its periphery 29 threaded, and the end of the inside wall of the housing 20 is correspondingly threaded, as shown at 30 in FIG. 2, to receive the cover plate. The cover plate is provided with a central opening to accommodate the outer end of the axle shaft, a portion of the wall of which opening is recessed on the inside to carry a bearing ring 31 for the reduced end 16 of the axle shaft. An annular flange 32, on the outer face of the cover plate 28, surrounding the central opening, has its outer periphery undercut so as to provide means for removably securing an outer seal cap 33 on the outer end of the cover plate, this seal cap 33 being formed of a suitable material, for example plastic. The cover plate 28 also is provided with a pair of diametrically opposite recesses 34 on its outer face to accommodate engaging fingers of a suitable tool or wrench used for mounting the cover plate in place in the end of the housing or for removing the cover plate from the housing when the assembly is to be dismantled. A set screw 35 near the end of the housing wall prevents any inadvertent turning of the cover plate with respect to the housing when the cover plate has been set in place.

A modified form of cover plate 26 is shown in FIG. 5 mounted on a slightly modified housing 20'. This modified cover plate 36 is secured to the housing 20' by a plurality of screws 37. The cover plate is provided with a central opening for the end portion 16 of the axle shaft and carries the bearing ring 31 for the end of the axle shaft. This cover plate is similarly provided with an annular flange 38 on its outer face, surrounding the opening for the end of the axle shaft, for removably holding the seal cap 33.

As will be readily understood, it is necessary in either case that the cover plate for the outer end of the housing 20 or 20' be heavy and strong enough to withstand the end thrusts of the rubber blocks 25, which end thrusts will be produced whenever a pair of opposite blocks are subjected to the compressing force exerted on them during the operation of the vehicle.

Further minor modifications would be possible in the construction of the separate members of the flexible drive assembly without departing from the principle of the invention, but the construction as illustrated, particularly in FIGS. 1 to 4 inclusive of the drawings, is considered the preferred manner of carrying out the invention.

I claim:

A removable flexible drive assembly attachment for a vehicle wheel having a hub rotatably mounted on the end of an axle shaft housing, said assembly attachment consisting of a hollow cylindrical member having approximately the same outer diameter as the wheel hub, means for removably securing said member co-axially on said wheel hub, an integral inner end wall on said member, said inner end wall having a central opening, a drive axle shaft for the vehicle wheel, said drive shaft extending from the axle housing through said central opening in said inner end wall and through said member, a drive sleeve removably mounted on said drive axle shaft in said member, cooperating splines and spline grooves on said drive axle shaft and said drive sleeve, longitudinally-extending flanges on said sleeve extending radially from said sleeve and terminating a slight distance from the inside cylindrical wall of said member, ribs extending radially inwardly from the inside cylindrical wall of said member and terminating a slight distance from said sleeve, removable blocks of resilient material interposed between said flanges and said ribs respectively, a removable cover plate on the outer end of said member, a central opening in said cover plate for the outer end of said axle shaft, a bearing for the end of said axle shaft in said central opening in said cover plate, and a cap on the outer face of said cover plate extending over the outer end of said axle shaft.

References Cited in the file of this patent

UNITED STATES PATENTS

| | | |
|---|---|---|
| 486,068 | Allington | Nov. 15, 1892 |
| 1,733,771 | Baker | Oct. 29, 1929 |
| 1,790,614 | Leipert | Jan. 27, 1931 |
| 1,868,163 | Evans | July 19, 1932 |
| 1,899,159 | Krotee | Feb. 28, 1933 |
| 2,849,871 | Moeller | Sept. 2, 1958 |